United States Patent [19]

Gallagher et al.

[11] Patent Number: 5,783,016
[45] Date of Patent: Jul. 21, 1998

[54] INSTRUMENT PANEL HAVING INTEGRATED AIRBAG DEPLOYMENT DOOR

[75] Inventors: Michael J. Gallagher, Hampton; Peter J. Iannazzi, Hampstead, both of N.H.

[73] Assignee: Davidson Textron, Inc., Dover, N.H.

[21] Appl. No.: 700,980

[22] Filed: Aug. 21, 1996

[51] Int. Cl.$^6$ .................... B32B 31/18; B60R 21/20
[52] U.S. Cl. ............ 156/214; 156/212; 156/267; 156/268; 156/285
[58] Field of Search ................. 156/212, 267, 156/291, 251, 214, 285, 268; 280/728.1, 728.3

[56] References Cited

U.S. PATENT DOCUMENTS

| | | |
|---|---|---|
| 4,759,568 | 7/1988 | Paefgen et al. . |
| 5,062,198 | 11/1991 | Sun .................... 156/291 |
| 5,080,749 | 1/1992 | Moriya et al. ........... 156/251 |
| 5,084,122 | 1/1992 | Fukushima et al. . |
| 5,088,765 | 2/1992 | Hirashima et al. . |
| 5,161,819 | 11/1992 | Rhodes, Jr. . |
| 5,238,264 | 8/1993 | Barnes . |
| 5,316,822 | 5/1994 | Nishijima et al. . |
| 5,394,602 | 3/1995 | Czapp et al. ............ 156/242 |
| 5,398,961 | 3/1995 | Rogers et al. .......... 280/728.3 |
| 5,536,351 | 7/1996 | Rheinlander et al. ....... 156/212 |

Primary Examiner—Richard Crispino
Attorney, Agent, or Firm—Reising, Ethington, Learman & McCulloch

[57] ABSTRACT

An automotive instrument panel includes a molded plastic retainer formed with an integral airbag deployment door surrounded by a channel defining a tear seam enabling the door to separate and hinge outwardly upon deployment of the airbag. A foam-backed cover of flexible plastic material is applied over the outer surface of the panel and is severed along the length of the channel to eliminate any influence that the cover may have on resisting the opening of the door. The severed cover portion can either be removed to expose the door or else be left in tact and bonded to the door.

5 Claims, 2 Drawing Sheets

INSTRUMENT PANEL HAVING INTEGRATED AIRBAG DEPLOYMENT DOOR

This invention relates to an instrument panel having an integrated airbag deployment door for normally concealing an inflatable airbag of the vehicle and more particularly to an improved method of applying an outer pliable skin to a rigid retainer of the panel and to the construction resulting therefrom.

BACKGROUND OF THE INVENTION

It is well known in automotive vehicles to mount an airbag beneath the instrument panel for deployment through an opening in the instrument panel. The opening in the panel is normally closed by a deployment door that is able to hinge open when the airbag is deployed to enable the bag to escape through the opening into the passenger compartment of the vehicle.

At present, there are two general approaches to incorporating the deployment door into the instrument panel structure. According to one approach, the instrument panel is preformed with the deployment opening which is subsequently closed by fitting the deployment door into the opening. In this case, the deployment door is formed separately from the instrument panel and is secured by a hinge to the rigid retainer structure of the instrument panel. U.S. Pat. No. 5,161,819, assigned to the same assignee as the present invention, discloses such a separate door arrangement for an instrument panel. Although this approach is widely used, there are manufacturing difficulties encountered in achieving a proper and repeatable fit of the door within the opening.

The other general approach has been to form the door as an integral portion of the instrument panel's rigid retainer structure. In such case, the retainer is molded to include channels isolating the door and defining a frangible tear seam line for the door. The channel is designed to enable the door to separate along the seam at a predetermined force threshold for deployment of the airbag system.

An outer decorative cover of a thermoplastic material such as polyvinyl chloride or polyurethane formed as a skin layer or such a layer backed with foam material can be applied to the door and surrounding portion of the retainer and in such cases provides a cover that extends across the adjoining channel. Such covers can inhibit door opening in response to airbag deployment. Accordingly, it is present practice to locally preweaken the skin layer or skin layer backed with foam to provide a tear seam over the channel that is configured structurally to separate so as to permit proper operation of the airbag system.

One way of dealing with the difficulties in forming a cover that is neither too weak nor too strong has been to eliminate the cover altogether from the entire instrument retainer structure. In many automotive interior applications, however, the specifications call for an instrument panel retainer that is covered to enhance its aesthetics, hence necessitating the need for an outer skin layer or skin layer backed by foam of the type described above. It would thus be desirable to provide a covering to an instrument panel having an integrated deployment door, but yet which offers little, if any, resistance to the outward opening of the deployment door like that of an uncovered door and instrument panel retainer combination.

SUMMARY OF THE INVENTION

According to the invention, an instrument panel assembly having an integral airbag deployment door is manufactured by molding a retainer from rigid plastics material having a main body portion mountable to support structure of the vehicle, an airbag deployment door portion, and a molded-in channel extending into the retainer from an outer surface thereof interconnecting the main body and door portions of the retainer and defining a hinge line and frangible tear seam line for the door portion enabling it to separate and swing outwardly from the main body portion of the retainer in response to deployment of the airbag. An adhesive is applied to the outer surface of at least the main body portion of the retainer. An outer cover prepared of a flexible plastic material is positioned over the outer surface of the retainer and a vacuum is drawn on the retainer to urge the cover against the main body and door portions of the retainer and down into the channel. Thereafter, the cover is severed within the channel to reduce the resistance that the cover may offer to the separation and outward swinging of the door portion of the retainer upon deployment of the airbag.

According to a particularly preferred embodiment of the invention, the severed portion of the cover overlying the door portion is removed to expose the door portion. In this way, it is assured that the cover has indeed been severed across the channel such that it cannot possibly offer any resistance to the outward swinging of the door portion. If the cutting of the cover within the channel is carefully controlled such that it is certain to have been completely severed across the channel, then the severed portion of the cover can be left on the door such that the entire instrument panel is covered. In doing so, the softness in the area of the door is retained. Also, the cover may aid in reducing or eliminating door fragmentation of the retainer upon deployment.

Accordingly, this invention provides a method of manufacturing and a resultant construction of an instrument panel assembly having the advantages of a deployment door that is integrated with the retainer structure of the instrument panel and including an outer pliable cover applied in such manner as not to inhibit the outward swinging of the door upon deployment of the airbag.

THE DRAWINGS

These and other features and advantages of the present invention will be readily appreciated as the same becomes better understood by reference to the following detailed description when considered in connection with the accompanying drawings, wherein.

Figure 2:
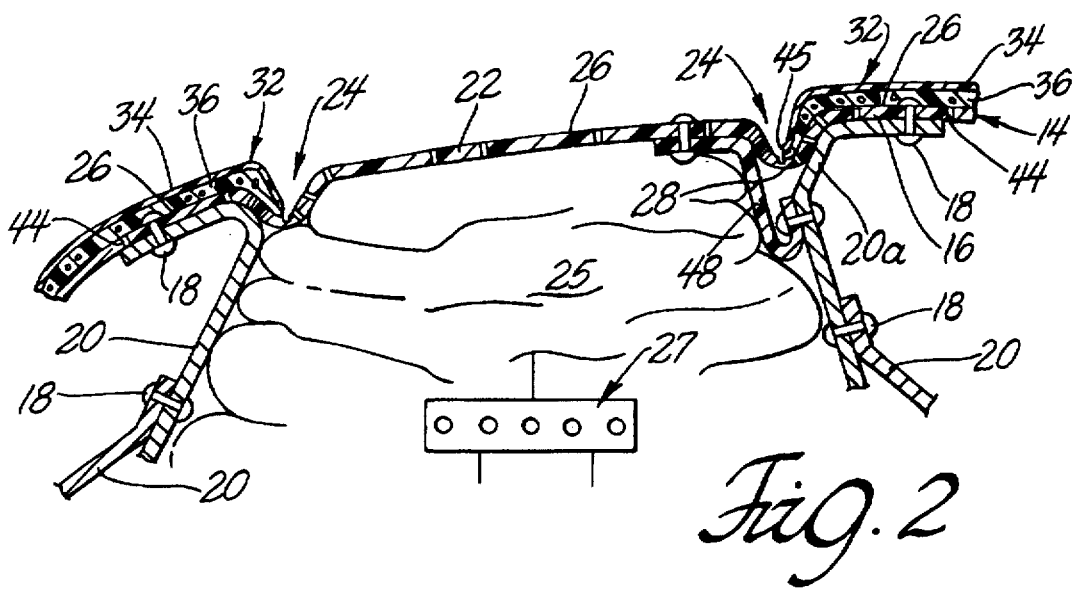
FIG. 2 is a diagrammatic cross-sectional view taken generally along line 2—2 of FIG. 1.
Figure 6:
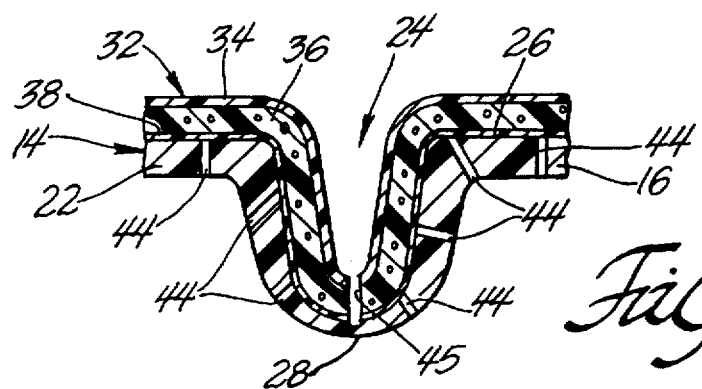
Figure 3:
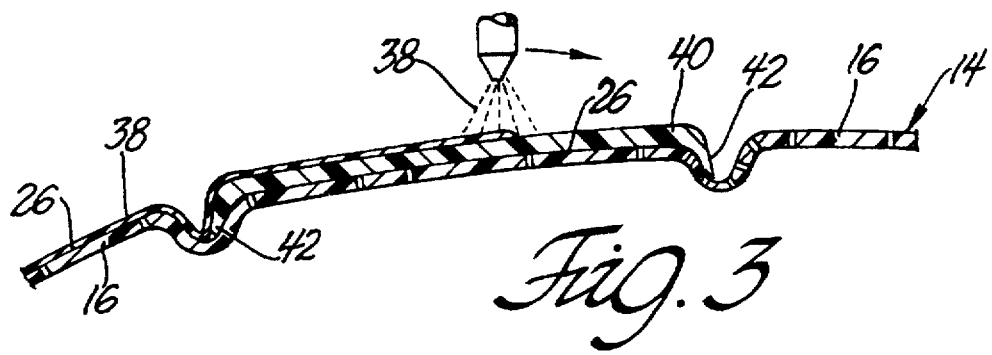
Figure 4:
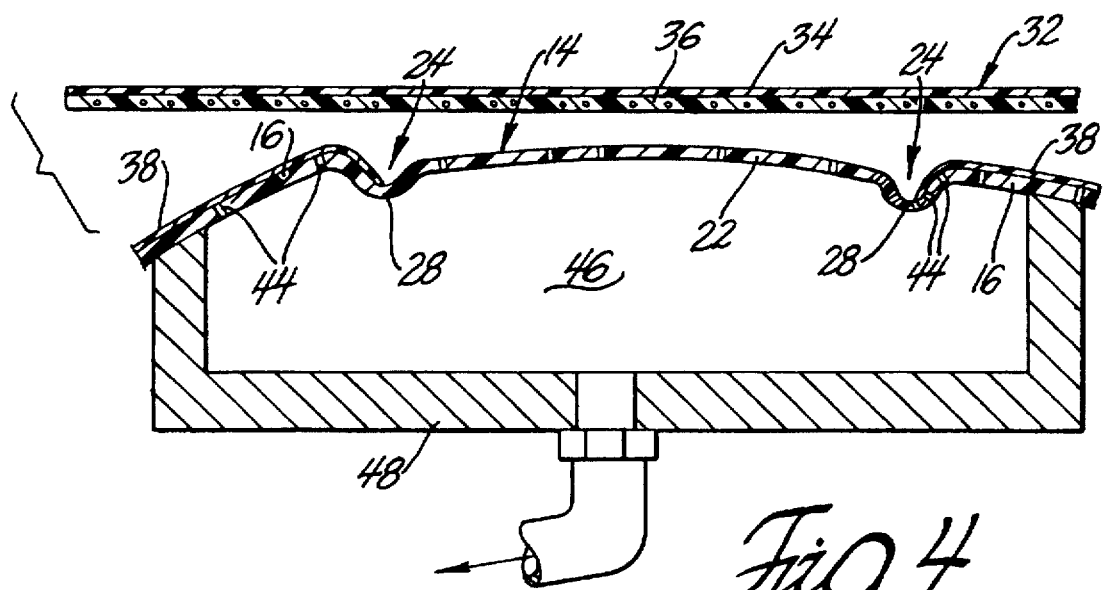
Figure 5:
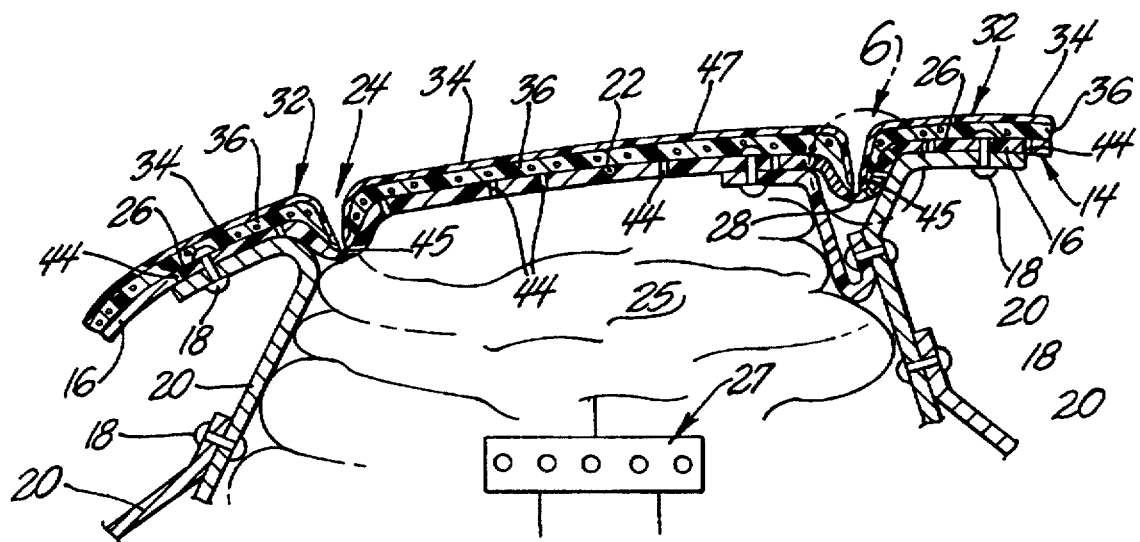

FIG. 3 diagrammatically illustrates adhesive being applied to the instrument panel retainer in a step of the invention;

FIG. 4 is a diagrammatic view illustrating the application of the foam-backed cover to the retainer in another step of the invention;

FIG. 5 is a diagrammatic cross-sectional view like FIG. 2 but of another embodiment of the invention; and FIG. 6 is an enlarged view of the encircled region of FIG. 5.

DETAILED DESCRIPTION

Figure 1:
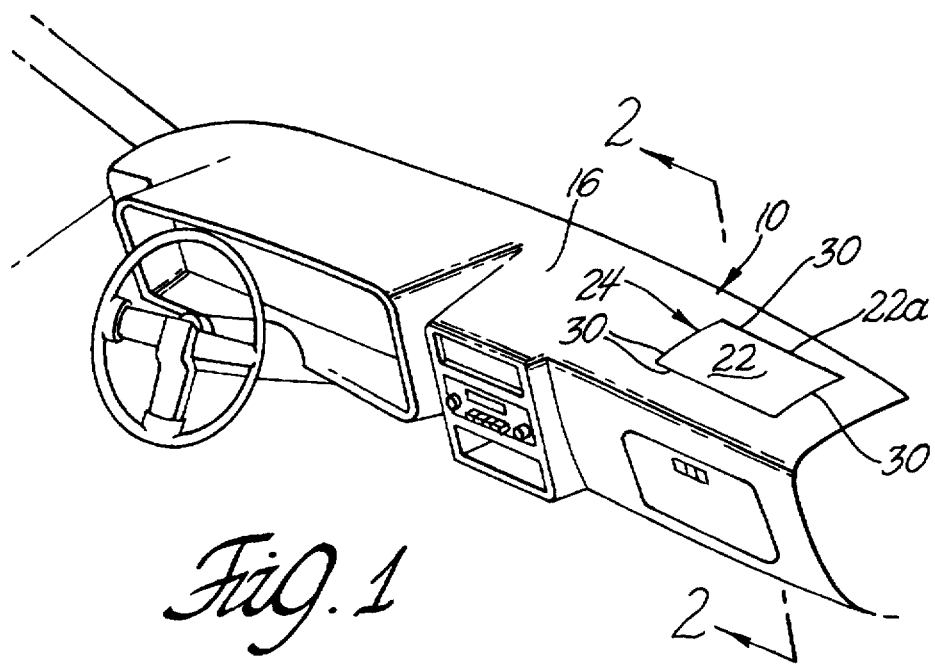
FIG. 1 is a diagrammatic perspective view of an instrument panel of the present invention.

FIGS. 1 and 2 illustrate an instrument panel 10 of an automotive vehicle 12 constructed according to a first presently preferred embodiment of the invention. The instrument panel 10 includes a rigid base panel or retainer 14 molded of rigid plastics material such as TPO (thermoplastic olefin), PP (polypropylene), PE (polyethylene) PC/ABS (polycarbonate-acrylonitrile-butadiene-styrene), ABS (acrylonitrile-butadiene-styrene), PU (polyurethane), having a main body portion 16 provided with suitable mounting hardware 18 for mounting the panel 10 securely on rigid support structure 20 of the vehicle 12.

The retainer 14 is molded as a separate unit to include an integrated deployment door portion 22 that is formed as one piece with the retainer 14 and secured to the surrounding main body portion 16 of the retainer 14 by a molded-in groove or channel 24 extending into the retainer 14 from an outer surface 26 thereof defining at its base a localized thin section 28 encircling the door portion 22 and defining a frangible tear seam line 30 for the door portion 22. The door 22 conceals an airbag 25 of a passenger safety inflatable restraint (PSIR) system 27 mounted beneath the instrument panel 10 in conventional manner.

A separately preformed decorative trim cover 32 is applied to the outer surface 26 of the retainer 14 and comprises an outer skin of vinyl or other plastic pliable material such as PVC/ABS (polyvinyl chloride acrylonitrile-butadiene-styrene), TPO (thermoplastic olefins), ASA (acrylonitrile-styrene-acrylic), ETP-TPO (blended elastomeric thermoplastic polymers and thermoplastic polyolefins) 34 backed by a thin foam layer 36 and bonded to the retainer 14 by a suitable adhesive 38. Suitable foams include PVC (polyvinyl chloride), PE (polyethylene), PP (polypropylene), PU (polyurethane). While the foam is preferred to add softness, it is not necessarily required if only a decorative appearance is required. While any compatible adhesive can be used, preferred examples include PU (polyurethane).

The cover 32 is manufactured as a separate unit, typically as a sheet taken from a roll. In accordance with the invention, the separate units, e.g., retainer 14 and cover 32 are joined. In one embodiment they are secured by spraying the adhesive 38 onto those regions of the outer surface 26 of the retainer 14 where it is desired to produce a bond between the cover 32 and retainer 14. According to the first embodiment, all but the door portion 22 and part of the channel 24 has the adhesive 38 applied thereto. To protect the door portion 22 from being coated by the adhesive, a spray mask 40 having a size and shape conforming to that of the door portion 22 may be placed over the door portion, as illustrated in FIG. 3, having a peripheral flange portion 42 that extends into the channel 24 and terminates at its base 28 to shield the wall on the door-side of the channel 24 from having adhesive applied thereto. After the adhesive 38 is applied to coat the outer surface 26 of the retainer 14, the spray mask 40 is removed to expose the uncoated door 22 and channel portions 24 of the retainer.

The trim cover 32 is then positioned over the outer surface 26 of the retainer 14 with the foam side facing the retainer 14 and then a vacuum is drawn through vacuum openings 44 in the retainer 14 to urge the cover 32 against the outer surface 26 and down into the channel 24. To facilitate the vacuum draw, the retainer 14 is formed with a plurality of vacuum openings 44 configured and arranged to render the retainer porous. The retainer 14 communicates on its backside with a vacuum chamber 46 of a suitable vacuum tool 48 illustrated diagrammatically in FIG. 4.

Once the cover 32 is bonded in place on the retainer 14, the cover 32 is cut along the channel 24 completely through to the base of the channel 24 in order to sever the cover 32 in the region overlying the channel 24 at the retainer 14. The cutting of the cover 32 along the channel 24 may be carried out by means of a cutting die (not shown) having a knife edge conforming to the outline of the channel which, when pressed into the channel 24, severs the cover 32, or by means of a knife (not shown) having a sharp cutting edge that is drawn along the channel to cut the cover 32. Other cutting techniques such as the use of a hot knife tool or a laser (not shown) that melts and hence severs the cover 32 when drawn along the channel 24, may also be employed, as may a cutting tool delivering a high pressure jet of water or other techniques commonly employed in the art to cut through plastics trim cover material. In any case, the cover 32 overlying the main body portion 16 of the retainer terminates at a severed edge 45 within the channel 24 so as to be detached from the remaining severed portion 47 of the cover overlying the door 22.

Once severed, the unadhered severed portion 47 of the cover that overlies the door portion 22 is removed according to the first embodiment of this invention thereby exposing the door 22 and assuring that the cover 32 has been completely cut along the channel 24. In this way, when the airbag 25 of the passenger safety inflatable restraint (PSIR) system 27 is deployed and the airbag acts on the backside of the door 22, the door portion 22 is able to separate from the surrounding main body portion 16 of the retainer 14 along the tear seam 30 of the channel 24 and hinge outwardly of the retainer 14 to provide a deployment opening through which the airbag 25 can escape into the interior compartment of the vehicle. Severing the cover 32 along the channel 24 assures that the cover 32 has no influence on the opening of the door 22 and hence does not resist or inhibit the outward swinging of the door portion 22 as the cover would if it were extended across the channel 24.

The front edge 22a of the door portion is connected by a hinge strap 48 to a front wall segment 20a of the retainer 20 such that when the door 22 separates on airbag deployment it will hinge upwardly and forwardly and remain tethered to the retainer 20.

FIGS. 5 and 6 illustrate an alternative embodiment of the invention which is identical to the embodiment described above except that the severed cover portion 47 is left in place on the underlying door portion 22 of the substrate and is bonded by the adhesive 38. In this embodiment, the spray mask 40 is dispensed with such that the entire outer surface, including the door portion 22, has the adhesive layer 38 applied thereto. When the cover 32 is vacuum drawn against the retainer 14, it bonds also to the door portion 22 and to the walls of the channel 24, such that when the cover 32 is severed along the channel 24 through the skin and the retainer, it remains in place and bonded to the respective door 22 and main body 16 portions of the retainer 14. This embodiment operates in the same way and has the same advantages provided by the first embodiment of FIGS. 1–5. While severing of the skin and retainer is shown, the skin and retainer could be cut partially so as to be adequately weakened to fracture or separate thereby to facilitate deployment. It should also be noted that severing of the skin and retainer does not have to occur on all four sides. The hinge side of the skin and retainer may not have to be severed in order for deployment to occur.

The invention has been described in an illustrative manner with respect to presently preferred embodiments, and it is to be understood that the terminology that has been used is intended to be in the nature of words of description rather than words of limitation. Obviously, many modifications and variations of the present invention in light of the above teachings may be made. It is therefore to be understood that within the scope of the appended claims, the invention may be practiced otherwise than as specifically shown and described.

What is claimed is:

1. A method of manufacturing an instrument panel assembly of an automotive vehicle having an integral airbag deployment door for normally concealing an inflatable airbag of the vehicle, said method comprising the steps of:

molding a retainer from rigid plastics material having a main body portion mountable to a support structure of the vehicle, an airbag deployment door portion, and a molded-in channel extending into the retainer from an outer surface thereof interconnecting the main body and door portions of the retainer as a unitary structure and defining a tear seam line for the door portion enabling the door portion to separate and swing outwardly of the main body portion in response to deployment of the airbag;

preparing a cover comprising an outer skin of flexible plastics material;

applying an adhesive to the outer surface of at least the main body portion of the retainer;

positioning the cover over the outer surface of the retainer and drawing a vacuum on the retainer to urge the cover against the main body and door portions of the retainer and down into the channel;

and severing the cover within the channel to reduce the resistance that the cover may offer to the separation and outward swinging of the door portion of the retainer upon deployment of the airbag.

2. In the method of claim 1, preventing the adhesive from being applied to the door portion of the retainer, and removing a severed portion of the cover overlying the door portion to reveal the underlying door portion.

3. In the method of claim 2, preventing the application of the adhesive to the door portion by positioning a protective spray mask over the door portion before applying the adhesive to the retainer and thereafter removing the mask to expose an adhesive-free outer surface of the door portion to prevent adherence of the cover to the door portion.

4. In the method of claim 1, applying the adhesive to the door portion in order to bond and retain the cover on the door portion after severance of the cover along the channel.

5. A method of manufacturing an instrument panel assembly of an automotive vehicle having an integral airbag deployment door for normally concealing an inflatable airbag of the vehicle, said method comprising the steps of:

molding a retainer from rigid plastics material having a main body portion mountable to support structure of the vehicle, an airbag deployment door portion, and a molded-in channel extending into the retainer from an outer surface thereof interconnecting the main body and door portions of the retainer as a unitary structure and defining a tear seam line for the door portion enabling the door portion to separate and swing outwardly of the main body portion in response to deployment of the airbag;

preparing a cover comprising an outer skin of flexible plastics material;

applying an adhesive to the outer surface of at least the main body portion of the retainer;

positioning the cover over the outer surface of the retainer and drawing a vacuum on the retainer to urge the cover against the main body and door portions of the retainer;

severing the cover from the door portion to reduce the resistance that the cover may offer to the separation and outward swinging of the door portion of the retainer upon deployment of the air bag; and preventing the adhesive from being applied to the door portion of the retainer by positioning a protective spray mask over the door portion before applying the adhesive to the retainer and thereafter removing the mask and skin overlying the door portion to reveal the underlying door portion.

* * * * *